United States Patent
Bohn et al.

(10) Patent No.: US 8,661,903 B2
(45) Date of Patent: Mar. 4, 2014

(54) MACHINE WITH EVALUATION OF THE OSCILLATION SPECTRUM OF A BELT OF THE MACHINE

(75) Inventors: Gunther Bohn, Rottendorf (DE); Karl Gebert, Marktbreit (DE); Jörg Niedergesaess, Ebenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 13/023,997

(22) Filed: Feb. 9, 2011

(65) Prior Publication Data
US 2012/0031187 A1 Feb. 9, 2012

(30) Foreign Application Priority Data
Feb. 10, 2010 (DE) .................. 10 2010 001 734

(51) Int. Cl.
*G01M 13/02* (2006.01)

(52) U.S. Cl.
USPC .................. 73/593; 73/584; 73/602; 73/627

(58) Field of Classification Search
USPC ........... 73/593, 577, 579, 584, 602, 618, 620, 73/627, 659, 660
See application file for complete search history.

(56) References Cited

U.S. PATENT DOCUMENTS

| | | | | |
|---|---|---|---|---|
| 3,850,031 A | * | 11/1974 | Schwenzfeier et al. | ... 73/862.41 |
| 4,073,007 A | * | 2/1978 | Boivin | ............. 702/43 |
| 4,928,538 A | * | 5/1990 | Burdess et al. | ............. 73/862.41 |
| 6,079,261 A | * | 6/2000 | Makela | ............. 73/160 |
| 6,334,358 B2 | * | 1/2002 | Muraoka et al. | ................. 73/146 |
| 6,357,301 B1 | * | 3/2002 | Berghs et al. | ............. 73/862.451 |
| 6,928,882 B2 | | 8/2005 | Stammberger et al. | |
| 7,491,142 B2 | * | 2/2009 | Takuroh et al. | ................ 474/137 |
| 7,677,847 B2 | | 3/2010 | Gebert | |
| 8,226,510 B2 | * | 7/2012 | Takuroh et al. | ................ 474/137 |
| 2004/0127317 A1 | * | 7/2004 | Takuroh et al. | ................ 474/117 |

(Continued)

FOREIGN PATENT DOCUMENTS

DE  10 2004 045 291 A1  1/2006
WO  WO 01/47650 A2  7/2001

OTHER PUBLICATIONS

TRUMMETER Präzisionsinstrument zum Messen der Riemenspannung [*TRUMMETER Precision instrument for measuring belt tension*]—Hilger und Kern GmbH Industrietechnik, Mannheim, 6 pages; Others; Jul. 2006.

*Primary Examiner* — Peter Macchiarolo
*Assistant Examiner* — Samir M Shah
(74) *Attorney, Agent, or Firm* — Henry M. Feiereisen LLC

(57) ABSTRACT

A machine has at least two wheels (at least one of them driven) arranged on a base body and connected with a revolving belt. A transmitter and a receiver are arranged on the base body. The transmitter transmits contactless to the belt a transmitted signal having an oscillation frequency, with the receiver from the belt a reflected signal in response to the transmitted signal. An evaluation device connected to the receiver checks if the reflected signal received by the receiver satisfies an acquisition condition indicating that a speed of the belt is in a predetermined speed range. The evaluation device determines, if the acquisition condition is satisfied, a frequency spectrum which is based of the oscillation frequency and the reflected signal in the predetermined speed range and indicative of a mechanical oscillation characteristic of the belt, and generates a control signal based on the evaluated frequency spectrum.

12 Claims, 4 Drawing Sheets

(56) References Cited

U.S. PATENT DOCUMENTS

| | | | |
|---|---|---|---|
| 2005/0220491 A1* | 10/2005 | Koide | 399/167 |
| 2009/0120763 A1* | 5/2009 | Takuroh et al. | 198/341.08 |
| 2009/0285512 A1 | 11/2009 | Gebert | |
| 2009/0299663 A1 | 12/2009 | Gebert et al. | |
| 2010/0070094 A1 | 3/2010 | Gebert | |
| 2012/0108373 A1* | 5/2012 | Doihara et al. | 474/28 |
| 2012/0135829 A1* | 5/2012 | Doihara et al. | 474/28 |
| 2012/0252612 A1* | 10/2012 | Kodama et al. | 474/69 |
| 2012/0258825 A1* | 10/2012 | Kodama et al. | 474/69 |

* cited by examiner

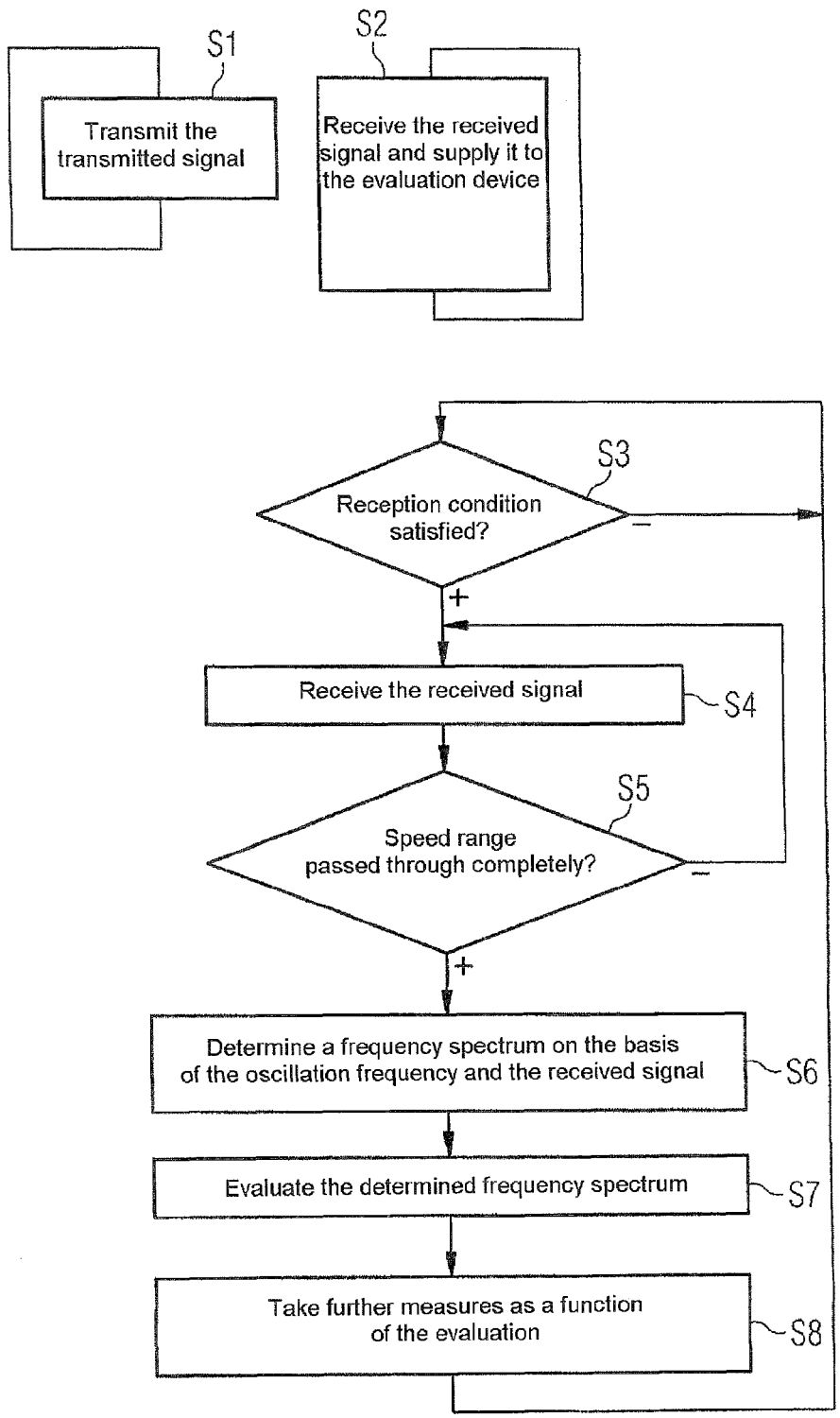

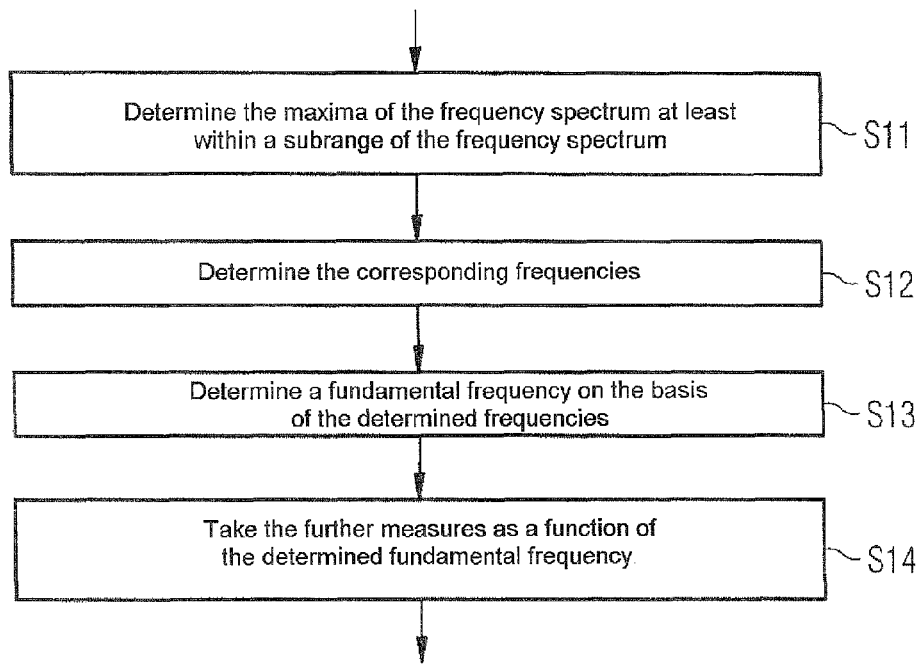

MACHINE WITH EVALUATION OF THE OSCILLATION SPECTRUM OF A BELT OF THE MACHINE

CROSS-REFERENCES TO RELATED APPLICATIONS

This application claims the priority of German Patent Application, Serial No. 10 2010 001 734.5, filed Feb. 10, 2010, pursuant to 35 U.S.C. 119(a)-(d), the content of which is incorporated herein by reference in its entirety as if fully set forth herein.

BACKGROUND OF THE INVENTION

The present invention relates to a machine, and more particularly to a machine tool, wherein the machine has at least two wheels arranged on a base body and coupled to one another via a revolving belt.

The following discussion of related art is provided to assist the reader in understanding the advantages of the invention, and is not to be construed as an admission that this related art is prior art to this invention.

Revolving belts of machines are subject to wear, and therefore have to be replaced from time to time. The wear increases severely when the belt revolves with an excessively high or excessively low belt stress.

To date, belt stress and characteristic oscillation frequency of the belt are measured only when the belt is stationary. Furthermore, the belt is often difficult to access, making the measurement difficult and cumbersome and sometimes inaccurate. Those measurements are therefore performed only at relatively long time intervals, for example once a month.

It would therefore be desirable and advantageous to address this problem and to obviate other prior art shortcomings by modifying a machine such that the belt stress can be measured and evaluated in a simple manner.

SUMMARY OF THE INVENTION

According to one aspect of the present invention, a machine includes a base body, at least two wheels arranged on the base body, at least one of the wheels being driven, a revolving belt coupling the wheels to one another, a transmitter arranged on the base body and transmitting contactlessly a first signal, which oscillates at an oscillation frequency, to the belt, a receiver arranged on the base body and receiving a second signal reflected from the belt in response to the first signal, an evaluation device evaluating the second signal supplied by the receiver by checking whether a detection condition is satisfied, wherein the detection condition is satisfied only if a speed of the belt is within a predetermined speed range, wherein, when the detection condition is satisfied, the evaluation device determines a frequency spectrum on the basis of the oscillation frequency and the second signal supplied to the evaluation device when the speed is within the predetermined speed range, evaluates the determined frequency spectrum and takes further measures as a function of the evaluation, wherein the frequency spectrum indicates at which frequencies the belt oscillates mechanically, and to what extent, when the speed is within the predetermined speed range.

The arrangement of the transmitter and receiver on the base body of the machine mean that measurements are possible without having to remove cladding parts or the like. Because the frequency spectrum is determined only when the speed is passing through a predetermined speed range, in conjunction with the diameter of the wheels, this means that the resonant frequency of the belt is "passed through" at least briefly, and therefore that the belt is excited to oscillate, as a result of which a frequency spectrum which can be evaluated meaningfully can be determined.

There are a number of options for determining the frequency spectrum. For example, it is possible for the evaluation device to determine a difference frequency signal by frequency mixing of the signal supplied to it and of an evaluation signal which oscillates at the oscillation frequency, and to determine the frequency spectrum by evaluation of the difference frequency signal.

Alternatively, it is possible for the evaluation device to determine a low-frequency signal by amplitude modulation, with respect to the oscillation frequency, of the signal which is supplied to it, and to determine the frequency spectrum by evaluation of the low-frequency signal.

The transmitted signal which is transmitted to the belt (and therefore also the signal reflected by the belt) can be defined as required. For example, it may be an ultrasound signal. In this case, the oscillation frequency corresponds to the sound frequency of the ultrasound signal and may, in particular, be in the two-digit kilohertz range.

Alternatively, it may be an electromagnetic radio-frequency signal. In this case, the oscillation frequency corresponds to the carrier frequency of the radio-frequency signal and may, in particular, be in the single-digit or two-digit Megahertz range.

Once again, alternatively, the transmitted signal which is transmitted to the belt may be an optical signal, in which case the wavelength of the light used may be in the infrared, visible or ultraviolet range. In this case, the oscillation frequency does not correspond to the frequency which corresponds to the wavelength of the light, but rather to a modulation frequency, with which the intensity of the transmitted light is modulated. By way of example, the oscillation frequency may be in the range from 10 kHz to 1 GHz. A range between 100 kHz and 100 MHz is preferred. A range between 1 MHz and 10 MHz is particularly preferred.

In order to evaluate the frequency spectrum, the evaluation device preferably determines the maxima of the frequency spectrum at least within a subrange of said frequency spectrum, determines a fundamental frequency on the basis of the frequencies at which the maxima occur, and takes the further measures as a function of the fundamental frequency.

The further measures may be of any desired nature. For example, the evaluation result can be output to a user of the machine and/or to a control device for the machine. Depending on the evaluation result—for example if the belt stress is extremely high or extremely low—the evaluation device can also take a direct control action on the operation of the machine, in particular stop the machine.

The predetermined speed range may be chosen as required. In particular, the predetermined speed range may correspond to the starting of the belt from rest up to a predetermined operating speed or above this. Alternatively or additionally, the predetermined speed range may correspond to the running down of the belt from the predetermined speed range or above this until the belt is stationary.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 shows a flowchart, FIG. 9 shows a flowchart.

DETAILED DESCRIPTION OF PREFERRED EMBODIMENTS

Figure 1:
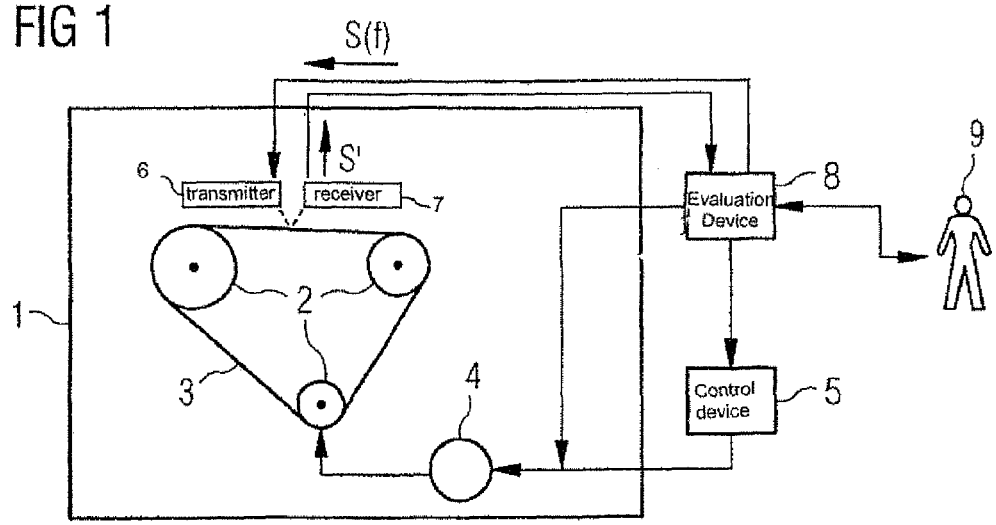
FIG. 1 is a schematic illustration of a machine.
Figure 2:
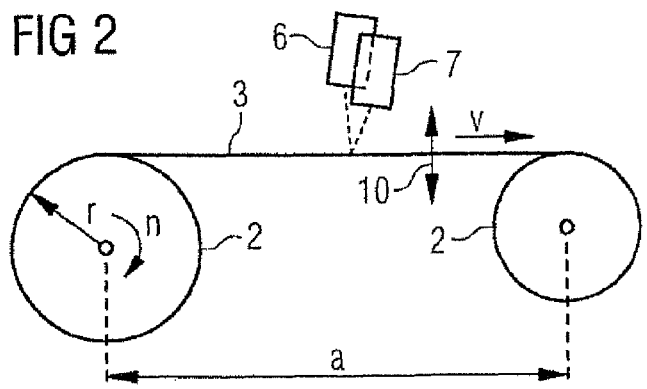
FIG. 2 is a schematic illustration of a belt section.
Figure 3:
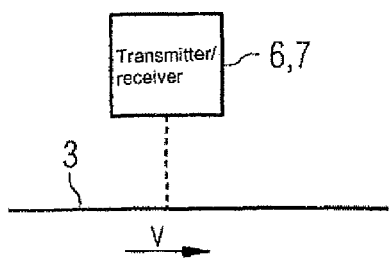
FIG. 3 illustrates the belt section as shown in FIG. 2 from the side.
Figure 4:
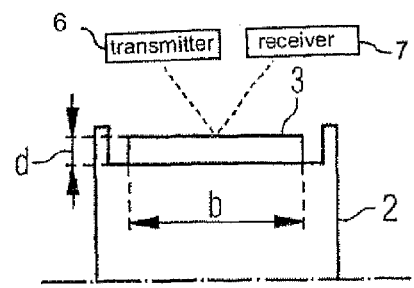
FIG. 4 illustrates the belt section as shown in FIG. 2, seen in a belt running direction.
Figure 5:
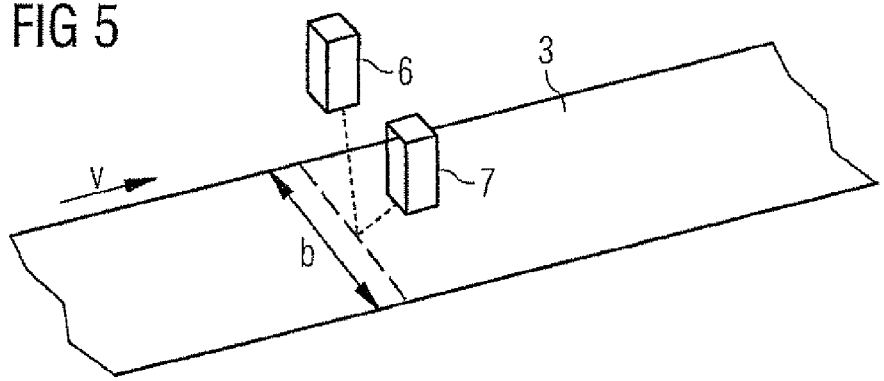
FIG. 5 is a perspective illustration of the belt section as shown in FIG. 2.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a machine having a base body 1. A plurality of wheels 2 (so-called pulleywheels) are arranged on the base body 1 and are coupled to one another via a revolving belt 3. There are at least two wheels 2. FIG. 1 shows three wheels 2. The number of wheels 2 could also be greater and, for example, could be 4, 5 etc.

At least one of the wheels 2 is driven by means of a drive 4. The drive 4 is controlled by a control device 5.

The machine may be of any desired nature. It is preferably a machine tool. The term "machine tool" is intended to cover not only machine tools in the traditional sense but also industrial robots and processing machines.

A transmitter 6 for transmission of a transmitted signal S is arranged on the base body 1. The transmitter 6 is at a distance from the belt 3, as can additionally be seen in FIGS. 2 to 5. The transmitted signal S can be transmitted contactlessly to the belt 3 by means of the transmitter 6. By way of example, the transmitted signal S may be an ultrasound, a radio-frequency or an optical signal.

The transmitted signal S oscillates at an oscillation frequency f. The oscillation frequency f may be chosen as required. In the case of an ultrasound signal, the oscillation frequency f is preferably between 10 kHz and 100 kHz. In the case of a radio-frequency signal, the oscillation frequency f is preferably between 1 MHz and 100 MHz, in particular between 4 MHz and 20 MHz. In the case of an optical signal, the oscillation frequency f is preferably between 10 kHz and 1 GHz. A frequency range from 100 kHz to 100 MHz is preferred in this case, and particularly preferably a frequency range from 1 MHz to 10 MHz.

The belt 3 is designed such that it reflects the transmitted signal S. If the reflection characteristic of the belt 3 is not already provided on the basis of the material and/or of the surface condition of the belt 3 itself, the belt 3 may for this purpose be provided with a suitable coating on its side facing the transmitter 6.

The signal reflected by the belt 3—referred to in the following text as the received signal and provided with the reference symbol S'—can be received by means of a receiver 7 which is likewise arranged on the base body 1. The receiver 7 is—preferably permanently, but at least temporarily—connected to an evaluation device 8 for signaling purposes, such that the receiver 7 can supply the received signal S' (if necessary after signal conversion to an electrical signal) to the evaluation device 8. The received signal S' can be evaluated by means of the evaluation device 8.

The machine operates, with regard to the present invention, as shown in FIG. 6, as follows:

As shown in FIG. 6, the transmitter 6 transmits the transmitted signal S in a step S1. In a step S2 the receiver 7 receives the signal reflected by the belt 3, that is to say the received signal S', and supplies it to the evaluation device 8. As shown in FIG. 6, steps S1 and S2 are carried out in parallel and continuously.

In a step S3, the evaluation device 8 checks whether a reception condition is satisfied. The reception condition is satisfied only when the speed v of the belt 3 is passing through a predetermined speed range.

It is possible for the process of passing through the predetermined speed range to be the sole precondition for satisfaction of the detection condition. In this case, the situation in which the speed v of the belt 3 is passing through the predetermined speed range is not only necessary but is also sufficient for satisfaction of the detection condition. Alternatively, it is possible for the detection condition to be satisfied only when at least one further condition is satisfied in addition to the process of passing through the predetermined speed range. In this case, the situation in which the speed v of the belt 3 is passing through the predetermined speed range is admittedly necessary for satisfaction of the detection condition, but is not sufficient. The (at least) one further condition may be chosen as required. By way of example, a number of conditions are listed in the following text, which can be predetermined individually, in groups of two or more, or all together:

Presetting of an appropriate input by a user 9 of the machine. In this case, the detection condition is satisfied only when the user 9 requests the evaluation.

A time condition. The time condition may, for example, be absolute (measurement every morning) or relative (so and so many hours have passed since the last measurement). The timing may be related to the clock time or to a machine running time.

The direction in which the speed range is passed through. It is therefore possible to define whether the evaluation is carried out only when the speed v of the belt 3 is increasing, or only when the speed v of the belt 3 is decreasing.

The predetermined speed range can be determined as required. In particular, the predetermined speed range may correspond to starting up the belt 3 from rest (speed v=zero) up to a predetermined operating speed. In this case, the condition is also satisfied when the belt 3 is accelerated from rest to above the predetermined operating speed. Alternatively or additionally, the predetermined speed range may correspond to the belt 3 being run down from the predetermined operating speed until the belt 3 is stationary. This also includes the belt 3 being run down starting from a higher speed than the predetermined operating speed.

When the detection condition is satisfied, the evaluation device 8 moves on to a step S4, as shown in FIG. 6. In step S4, the evaluation device 8 receives the received signal S' received by the receiver 7 (or its electrical pendant).

In a step S5, the evaluation device 8 checks whether the speed v of the belt 3 has already passed completely through the predetermined speed range. If the speed v of the belt 3 has passed completely through the predetermined speed range, the evaluation device 8 moves on to steps S6 to S8, as shown in FIG. 6.

In step S6, the evaluation device 8 determines a frequency spectrum. The evaluation device 8 determines the frequency spectrum on the basis of the oscillation frequency f and of the received signal S which is supplied to it by the receiver 7, while the speed v of the belt 3 is passing through the predetermined speed range. In step S7, the evaluation device 8 evaluates the frequency spectrum determined by it. In step S8, the evaluation device 8 takes further measures as a function of the evaluation of the step S7.

It is evident from the above statements that the signal S' reflected by the belt 3 is detected by the receiver 7, while the belt 3 is revolving at a changing speed v. The belt 3 therefore oscillates mechanically, to be precise as indicated by the arrow 10 in FIG. 2 orthogonally to its running direction. The oscillation is particularly severe when the speed v of the belt 3 corresponds to the resonant frequency of the belt 3. The evaluation by the evaluation device 8 is therefore carried out such that the frequency spectrum indicates the frequencies at which the belt 3 oscillates mechanically, and to what extent, while passing through the predetermined speed range.

The resonant frequency of the belt 3 is governed essentially by intrinsic characteristics of the belt 3, such as its material, its width b and its thickness d, the distance a between the wheels 2 which are adjacent to the measurement point, and the belt stress. Since the intrinsic characteristics of the belt 3 and the distance a are generally known in advance, the resonant frequency and the belt stress can thus be converted to one another. The corresponding functional relationships are known to those skilled in the art, or can be determined experimentally if necessary.

The speed v of the belt 3 corresponds, via the relationship:

$$v=2\pi rn$$

to the rotation speed n of the wheels 2. In the above relationship, v is the speed v of the belt 3. r is the radius of one of the wheels 2, n is the corresponding rotation speed (in the unit revolutions per second). The rotation speeds n of the wheels 2 which are adjacent to the measurement point—and which differ from one another if the wheels 2 have different radii r—therefore correspond to excitation frequencies for the oscillation of the belt 3. Because the speed range is passed through continuously, the corresponding frequency range through which the excitation frequency passes is also continuous. If the speed range is chosen appropriately, it is therefore possible to ensure that the resonant frequency of the belt 3 is within the frequency range through which the excitation frequency passes.

Figure 7:
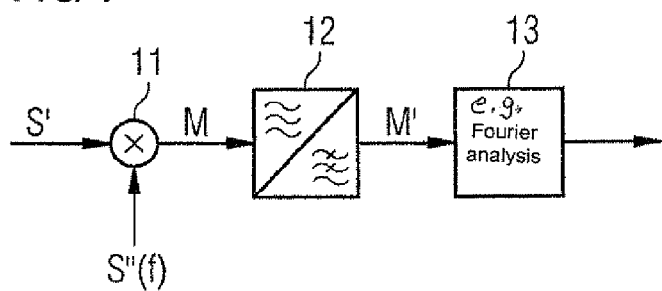
FIG. 7 shows one possible form of signal evaluation.

The received signal S' can be evaluated in various ways. For example, as shown in FIG. 7, it is possible for the evaluation device 8 to have a frequency mixer 11 to which the received signal S' (or an electrical signal derived from it) and an evaluation signal S", which oscillates at the oscillation frequency f, are supplied. By way of example, the evaluation signal S" may be a signal which corresponds to the transmitted signal S. The frequency mixer 11 uses the received signal S' and the evaluation signal S" in a manner known per se to produce a mixed signal M, which contains two mixed signal components. One mixed signal component oscillates at the sum of the frequencies of the evaluation signal S" and of the received signal S', and the other mixed signal component oscillates at the difference between these frequencies.

The mixed signal M is subjected to low-pass filtering in a low-pass filter 12. The output signal M' from the low-pass filter 12 therefore corresponds only to the mixed signal component, which oscillates at the difference between the frequencies of the received signal S' and the evaluation signal S". The output signal M' from the low-pass filter 12 now essentially contains only the oscillations of the belt 3. The output signal M can therefore be evaluated by the evaluation device 8 in a block 13. By way of example, a Fourier analysis can be carried out on the output signal from the low-pass filter 12 in the block 13. The output signal M' therefore corresponds to a difference frequency signal from the frequency mixer 11.

Figure 8:
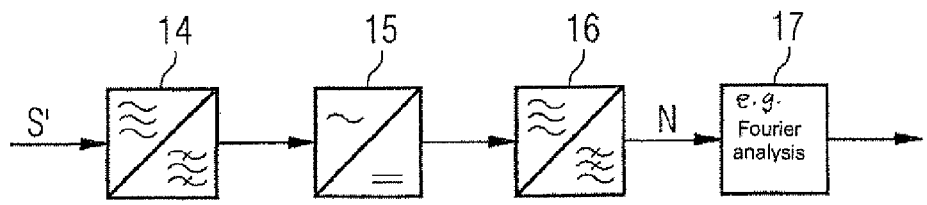
FIG. 8 shows a further possible form of signal evaluation.

As an alternative to the procedure shown in FIG. 7, the received signal S' can be evaluated as shown in FIG. 8, by subjecting the received signal S' to bandpass filtering first of all in a bandpass filter 14. The signal which has been subjected to bandpass filtering is supplied to a rectifier 15, which rectifies the signal which has been subjected to bandpass filtering. The rectified signal is supplied to a low-pass filter 16. An output signal N from the low-pass filter 16 is now only at low frequency.

The procedure in FIG. 8 corresponds to amplitude modulation, with respect to the oscillation frequency f, of the received signal S. The output signal N from the low-pass filter 16 now contains essentially only the oscillations of the belt 3. The output signal N can be evaluated analogously to the procedure in FIG. 7 in a block 17, for example by Fourier analysis.

It is possible for the evaluation device 8 to evaluate the entire frequency spectrum of the belt 3 in step S7 in FIG. 6. Alternatively, it is possible for the evaluation device 8 to evaluate only a subrange of the frequency spectrum of the belt 3. However, irrespective of which procedure is adopted, the procedure for the purposes of step S7 in FIG. 6 is preferably as follows, as shown in FIG. 9:

In a step S11, the evaluation device 8 determines the maxima of the frequency spectrum, that is to say the strongest oscillation components, at least within the subrange of the frequency spectrum. In a step S12, the evaluation device 8 determines the corresponding frequencies. In a step S13, the evaluation device 8 determines a fundamental frequency on the basis of the frequencies determined in step S12. The further measures in step S8 in FIG. 6 are taken, in the case of the procedure in a step S14 in FIG. 9, as a function of the fundamental frequency determined in step S13.

In the simplest case, in the context of step S13 in FIG. 9, the lowest frequency at which a significant oscillation maximum occurs can be defined to be the fundamental frequency. However, alternatively, more complex procedures are possible. If—purely by way of example—significant oscillation maxima occur at 40 Hz and 60 Hz, then the fundamental frequency cannot be 40 Hz, since 60 Hz cannot be the first harmonic oscillation of 40 Hz. In this case, however, the fundamental frequency can be considered to be 20 Hz, since in this case, the two detected maxima correspond to the first and second harmonics of the fundamental frequency. In general, the fundamental frequency can be considered to be the highest common denominator of the frequencies at which a significant oscillation maximum occurs.

The further measures in step S8 in FIG. 6 and step S14 in FIG. 9 can be defined as required. In the simplest case, only one output is produced. It is possible to output (individually or in any desired combination) the determined frequency spectrum itself, the determined fundamental frequency, a determined belt stress or some other, derived value, for example a remaining life of the belt 3. The output can be made directly to the user 9. Alternatively or additionally, it can be transmitted to another electronic device, for example to a superordinate control device (not illustrated) or to the control device 5 of the machine.

Alternatively or in addition to an output of the frequency spectrum or of some other value, it is possible for the evaluation device 8—if necessary—to intervene directly or indirectly in the operation of the machine. For example, an appropriate control command can be predetermined for the control device 5 of the machine, or the drive 4 can be stopped directly, for example by switching off its power supply.

The arrangement of the transmitter 6 and of the receiver 7 may be defined as required. In trials, it has been found to be advantageous to arrange the transmitter 6 and the receiver 7 alongside one another, and at the same height above or below the belt 3, in a manner corresponding to the illustrations in FIGS. 3 to 5. The configuration of the transmitter 6 and of the receiver 7 can also be defined as required. In trials, it has been found to be advantageous for the transmitter 6 and the receiver 7 each to be rectangular elements, whose longer sides run parallel to the belt running direction, and whose narrower sides run transversely with respect to the belt running direction.

Modifications of the present invention are possible. In particular, it is possible to operate the transmitter 6 and/or the receiver 7 not continuously, but only when the detection condition is satisfied.

The present invention has many advantages. In particular, permanent monitoring of the belt 3 is possible in a simple manner. There is no need to fit and remove parts. Furthermore, the present invention can be implemented even when the belt 3 is arranged at a point on the machine to which access is difficult. The life of the belt 3 can be utilized in an optimum manner, while there is nevertheless no risk of failure of the belt 3, or else of damage caused by a defective belt 3.

The above description is intended only to explain the present invention. The scope of protection of the present invention is intended to be defined, in contrast, exclusively by the attached claims.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machine, comprising:
   at least two wheels arranged on a base body, with at least one of the wheels being driven;
   a revolving belt coupling the at least two wheels with one another;
   a transmitter arranged on the base body and transmitting contactless to the belt a transmitted signal having an oscillation frequency;
   a receiver arranged on the base body and receiving from the belt a reflected signal in response to the transmitted signal; and
   an evaluation device connected to the receiver and checking if the reflected signal received by the receiver satisfies an acquisition condition indicating that a speed of the belt is in a predetermined speed range, wherein the evaluation device determines, if the acquisition condition is satisfied, a frequency spectrum which is based on the oscillation frequency and the reflected signal in the predetermined speed range and indicative of a mechanical oscillation characteristic of the belt, and generates a control signal based on the determined frequency spectrum.

2. The machine of claim 1, wherein the machine comprises a machine tool.

3. The machine of claim 1, wherein the control signal comprises an output signal for display to a user of the machine.

4. The machine of claim 1, wherein the control signal is transmitted to a control device for controlling a machine operation.

5. The machine of claim 4, wherein the control signal initiates a stop of the machine operation.

6. The machine of claim 1, wherein the frequency spectrum is generated as a difference frequency signal by frequency mixing of the oscillation frequency and the reflected signal in the predetermined speed range.

7. The machine of claim 1, wherein the evaluation device determines the frequency spectrum by evaluation of a low-frequency signal obtained by amplitude demodulation at the oscillation frequency of the reflected signal.

8. The machine of claim 1, wherein the transmitted signal is a radio-frequency signal.

9. The machine of claim 1, wherein the evaluation device determines amplitude maxima of the frequency spectrum at least in a subrange of the frequency spectrum, determines a fundamental frequency based on frequencies at which the amplitude maxima occur, and generates the control signal based on the fundamental frequency.

10. The machine of claim 1, wherein the predetermined speed range covers a range from zero speed of the belt at rest to a predetermined operating speed or above.

11. The machine of claim 1, wherein the transmitted signal is at least one signal selected from the group consisting of ultrasound signal and optical signal.

12. The machine of claim 1, wherein the predetermined speed range covers a range from a predetermined operating speed or above to zero speed of the belt at rest.

* * * * *